United States Patent
Schlegel et al.

(10) Patent No.: US 7,443,343 B2
(45) Date of Patent: Oct. 28, 2008

(54) FIXTURE FOR MOBILE RADIO EQUIPMENT IN A VEHICLE

(75) Inventors: Thomas Schlegel, Nuremberg (DE); Karsten Straub, Crailsheim (DE)

(73) Assignee: Auditon Kabelwerk GmbH Zweigniederlassung, Scheinfeld (DE)

( * ) Notice: Subject to any disclaimer, the term of this patent is extended or adjusted under 35 U.S.C. 154(b) by 294 days.

(21) Appl. No.: 10/553,433

(22) PCT Filed: Apr. 21, 2004

(86) PCT No.: PCT/DE2004/000849

§ 371 (c)(1),
(2), (4) Date: Jul. 19, 2006

(87) PCT Pub. No.: WO2004/095634

PCT Pub. Date: Nov. 4, 2004

(65) Prior Publication Data

US 2007/0178754 A1    Aug. 2, 2007

(30) Foreign Application Priority Data

Apr. 23, 2003    (DE) .............................. 103 18 296

(51) Int. Cl.
*H01Q 1/38*    (2006.01)
(52) U.S. Cl. ........................ 343/700 MS; 343/702; 343/741; 343/846; 343/851
(58) Field of Classification Search .......... 343/700 MS, 343/702, 741, 846, 851, 895
See application file for complete search history.

(56) References Cited

U.S. PATENT DOCUMENTS 5,801,660 A * 9/1998 Ohtsuka et al. ....... 343/700 MS

FOREIGN PATENT DOCUMENTS

| DE | 93 11 242.4 | 10/1993 |
| DE | 297 23 679 U1 | 2/1999 |
| DE | 297 24 042 U1 | 10/1999 |
| DE | 100 37 241 A1 | 2/2002 |
| WO | WO 98/25323 | 6/1998 |
| WO | WO 02/091516 A1 | 11/2002 |

* cited by examiner

*Primary Examiner*—Douglas W. Owens
*Assistant Examiner*—Chuc Tran
(74) *Attorney, Agent, or Firm*—Fulbright & Jaworski, LLP

(57) ABSTRACT

The invention relates to a vehicle mobile radio holder for mounting a mobile radio terminal in a vehicle, with the vehicle mobile radio holder having a housing with a first housing part which is shaped to hold a mobile radio terminal. The vehicle mobile radio holder also has an electrical interface for connection of an external antenna to the vehicle mobile radio holder, and a coupling antenna which is electrically connected to the interface, for non-contacting electromagnetic coupling of RF signals between the coupling antenna and the antenna of the mobile radio terminal which is inserted into the vehicle mobile radio holder. The vehicle mobile radio holder also has one or more elements for reflection of electromagnetic radiation which has been emitted from the antenna of the mobile radio terminal inserted into the vehicle mobile radio holder and has not been injected into the coupling antenna, and/or has one or more elements for absorption of this electromagnetic radiation.

15 Claims, 10 Drawing Sheets

FIXTURE FOR MOBILE RADIO EQUIPMENT IN A VEHICLE

CROSS-REFERENCE TO RELATED APPLICATIONS

This application is a national stage filing of PCT/DE2004/000849 filed Apr. 21, 2004 claiming priority to DE 10318296.9-21 filed Apr. 24, 2003.

TECHNICAL FIELD

The invention relates to a vehicle mobile radio holder for mounting a mobile radio terminal in a vehicle, with the vehicle mobile radio holder having a housing with a first housing part which is shaped to hold a mobile radio terminal an electrical interface for connection of an external antenna to the vehicle mobile radio holder, and a coupling antenna which is electrically connected to the interface, for non-contacting electromagnetic coupling of RF signals between the coupling antenna and the antenna of a mobile radio terminal which is inserted into the vehicle mobile radio holder.

BACKGROUND OF THE INVENTION

Nowadays, mobile radio terminals are available in a very wide range of different embodiments. In this case, models are also available in which the mobile radio terminal is no longer equipped with an antenna socket for connection of an external antenna. In order to allow these mobile radio terminals to be operated with an external antenna despite this, antenna couplers are known, which allow capacitive and/or inductive coupling of RF signals between the antenna coupler and the antenna of the mobile radio terminal.

DE 100 37 241 A1 describes a cellular telephone holder for installation in the passenger compartment of a vehicle, which holder is attached to the windshield of the motor vehicle.

The cellular telephone holder is connected by means of a holding arm to an integrated antenna and has a stabilization apparatus, which is arranged at the lower end of the cellular telephone holder and stabilizes and fixes the mobile radio terminal in the cellular telephone holder. This stabilization apparatus comprises, for example, a clamping bracket or a permanent magnet. The holding arm is attached to the windshield of the motor vehicle by means of a suction apparatus. Furthermore, the cellular telephone holder has a coupling antenna which is arranged at the upper end of the cellular telephone holder and which, when a mobile radio is inserted, allows the RF signal to be capacitively coupled between the antenna of the mobile radio and the cellular telephone holder.

Furthermore, DE 297 24 042 U1 describes an antenna connector for transmission of RF signals from an external antenna to a cordless portable telephone. The antenna connecter is in this case attached to the antenna stub of the cordless portable telephone by means of a Velcro strip.

The antenna connector comprises a switching element and a ground element. The switching element transmits the RF signal capacitively and/or inductively from the external antenna to the main antenna of the portable telephone. The switching element has a meandering loop composed of conductive material, which is accommodated on a mount composed of non-conductive material. The ground element is coupled to the ground plane of the telephone. The meandering loop is arranged alongside the main antenna of the portable telephone when RF signals are being transmitted.

The invention is now based on the object of specifying an improved vehicle mobile radio holder for mobile radio terminals which are not equipped with an antenna socket.

BRIEF SUMMARY OF THE INVENTION

This object is achieved by a vehicle mobile radio holder for mounting a mobile radio terminal in a vehicle, with the vehicle mobile radio holder having a housing with a first housing part which is shaped to hold a mobile radio terminal an electrical interface for connection of an external antenna to the vehicle mobile radio holder, and a coupling antenna which is electrically connected to the interface, for non-contacting electromagnetic coupling of RF signals between the coupling antenna and the antenna of a mobile radio terminal which is inserted into the vehicle mobile radio holder, and one or more elements for reflection of electromagnetic radiation which has been emitted from the antenna of the mobile radio terminal inserted into the vehicle mobile radio holder and has not been injected into the coupling antenna, and/or has at least one element for absorption of this electromagnetic radiation.

The invention provides particularly low-loss electromagnetic coupling between typical internal antennas of mobile radio terminals, which have a pronounced directionality characteristic, and are generally operated in two or more different frequency bands (dual band, three band), and external antennas. Furthermore, this reduces the proportion of the field components penetrating into the interior of the vehicle from the electromagnetic field which is emitted from the antenna of a mobile radio terminal that is not equipped with an antenna socket. The field strength produced within a vehicle by a mobile radio terminal such as this is thus on the one hand reduced in that the electromagnetic coupling between the internal antenna of the mobile radio terminal and the antenna coupler is improved, and on the other hand is reduced in that the proportion of the electromagnetic field which is produced by the mobile radio terminal and enters the interior is reduced. The improvement in the electromagnetic coupling means that the mobile radio terminal is not forced to increase the transmission power in order to ensure adequate transmission quality.

This avoids the shielding effect of the vehicle bodywork resulting in considerably higher field strengths, because of resonance effects, than in the open air, that is to say outside the vehicle.

Advantageous refinement of the invention are described in the dependent claims.

It has been found to be particularly advantageous to use a conductive layer, which is arranged underneath the coupling antenna when viewed from the inserted mobile radio terminal, as the element for reflection of electromagnetic radiation which is emitted from the antenna of the mobile radio terminal and is not injected into the coupling antenna. An arrangement such as this admittedly increases the field strength in the direction of the front face of the mobile radio terminal. On the other hand, the field components which are injected into the antenna coupler are so much greater so that, overall, the field components which penetrate into the interior of the vehicle are reduced, by virtue of the measures described above. One particularly advantageous arrangement of a conductive layer such as this comprises the conductive layer covering at least the area covered by the coupling antenna and/or being aligned essentially at right angles to the main emission direction of the antenna of the inserted mobile radio terminal. Investigations have shown that an arrangement such as this makes it possible to achieve particularly good results.

Furthermore, it is expedient to arrange conductive layers, which act as reflection elements, at the side of the antenna coupler, and thus to focus field components which have been emitted past the antenna coupler at the side to the antenna coupler.

One particularly cost-effective and simple option from the production point of view is in this case to coat those housing parts of the vehicle mobile radio holder which face away from the inserted mobile radio terminal with an electrically conductive layer, or to produce these housing parts from an electrically conductive plastic.

According to one preferred exemplary embodiment of the invention, the housing of the vehicle mobile radio holder has a housing part which at least partially surrounds the inserted mobile radio terminal together with the housing part that is shaped to hold the mobile radio terminal and is coated with an electrically conductive layer, or is composed of an electrically conductive plastic. This means that those field components which emerge from the front face of the mobile radio terminal are reflected onto the coupling antenna, and can thus be injected. By combination with a reflective element arranged behind the coupling antenna, it is also possible in this way to produce a standing wave between two reflective elements, thus making it possible to increase the efficiency of the coupling antenna, and thus to further reduce the coupling loss.

In this case, it is expedient to produce the housing part at least in places from an optically transparent material or material composite, so that the mobile radio terminal display can still be read when it is inserted. In order to make it easier to insert the mobile radio terminal into the vehicle mobile radio holder, it is advantageous for this housing part to be detachably connected by the user to the housing part which is shaped to hold the mobile radio terminal. By way of example, a locking mechanism or a latching mechanism is provided for this purpose, by means of which the two housing parts can be detachably connected. Furthermore, it is also possible to connect the two housing parts to one another by means of hinges.

Furthermore, it is expedient to use a foam which absorbs electromagnetic radiation as the absorbent element, which is arranged underneath the coupling antenna and/or to the side of the coupling antenna, when seen from the inserted mobile radio terminal. In addition, it is possible to provide one or more absorber structures which absorb electromagnetic radiation as the absorbent element, which are arranged underneath the coupling antenna, or to the side of the coupling antenna, when seen from the inserted mobile radio terminal. Absorbent elements such as these on the one hand reduce the field strength of the field components which penetrate into the interior of the vehicle, and on the other hand to improve the tuning capability of the coupling antenna, and thus the coupling antenna efficiency that can be achieved. This reduces the influence of changing unpredictable environmental conditions on the capacitive and inductive coupling between the antenna of the mobile radio terminal and of the coupling antenna, thus making it possible to further optimize this coupling.

Furthermore, it is expedient to use reflective elements such as these and absorbent elements such as these in combination, and, for example, to arrange elements which reflect at the side, and an absorbent element underneath the antenna coupler.

The efficiency of the absorber structures can be increased by aligning them essentially at right angles to the main emission direction of the antenna of the inserted mobile radio terminal.

One particularly effective way to arrange the absorber structures in a cost-effective manner from the production point of view is to provide housing parts of the vehicle mobile radio holder which form that face of the housing of the vehicle mobile radio holder which faces away from the inserted mobile radio terminal, at least in places, with a layer composite which has absorber structures. Further housing parts of the vehicle mobile radio holder can be provided with a layer composite such as this at least in places, in the same manner. In this case, it is also possible to design this layer composite to be at least partially transparent by means of appropriate choice of materials, so that transparent windows are also possible in a housing part which acts as a cover.

In order to increase the efficiency of the antenna coupler, it is advantageous to align the coupling antenna essentially at right angles to the main emission direction of the antenna of the inserted mobile radio terminal. As already described above, the antennas of mobile radio terminals which are not provided with a connecting socket for connection of an external antenna generally have a highly direction characteristic, thus resulting in a clear main emission direction.

In this case, it has been found to be particularly advantageous to use a coupling antenna which has three conductors which are arranged essentially parallel to one another and are coupled to one another, with the outer conductors being connected to form a loop which is not entirely closed, and is composed of conductive material, and surrounds the central conductor. Furthermore, it has been found to be advantageous to use coupling antennas which are in the form of a two-layer or multiple-layer coupling structure with two or more coupling structure elements arranged one above the other. This coupling antenna is also particularly highly efficient in the specific environment in this case.

The higher the efficiency of the coupling antenna, the better the results which can be achieved by the use of reflective and/or absorbent elements, which respectively reflect and absorb electromagnetic radiation which is emitted from the antenna of the mobile radio terminal and is not injected into the coupling antenna, since this also reduces the influence of these elements on the tuning of the antenna coupler.

BRIEF DESCRIPTION OF THE DRAWINGS

The invention will be explained in the following text using, by way of example, a plurality of exemplary embodiments and with the assistance of the attached drawings, in which:

FIG. 7b shows a second view of the vehicle mobile radio holder as shown in FIG. 7a.

DETAILED DESCRIPTION OF THE INVENTION

Figure 1:
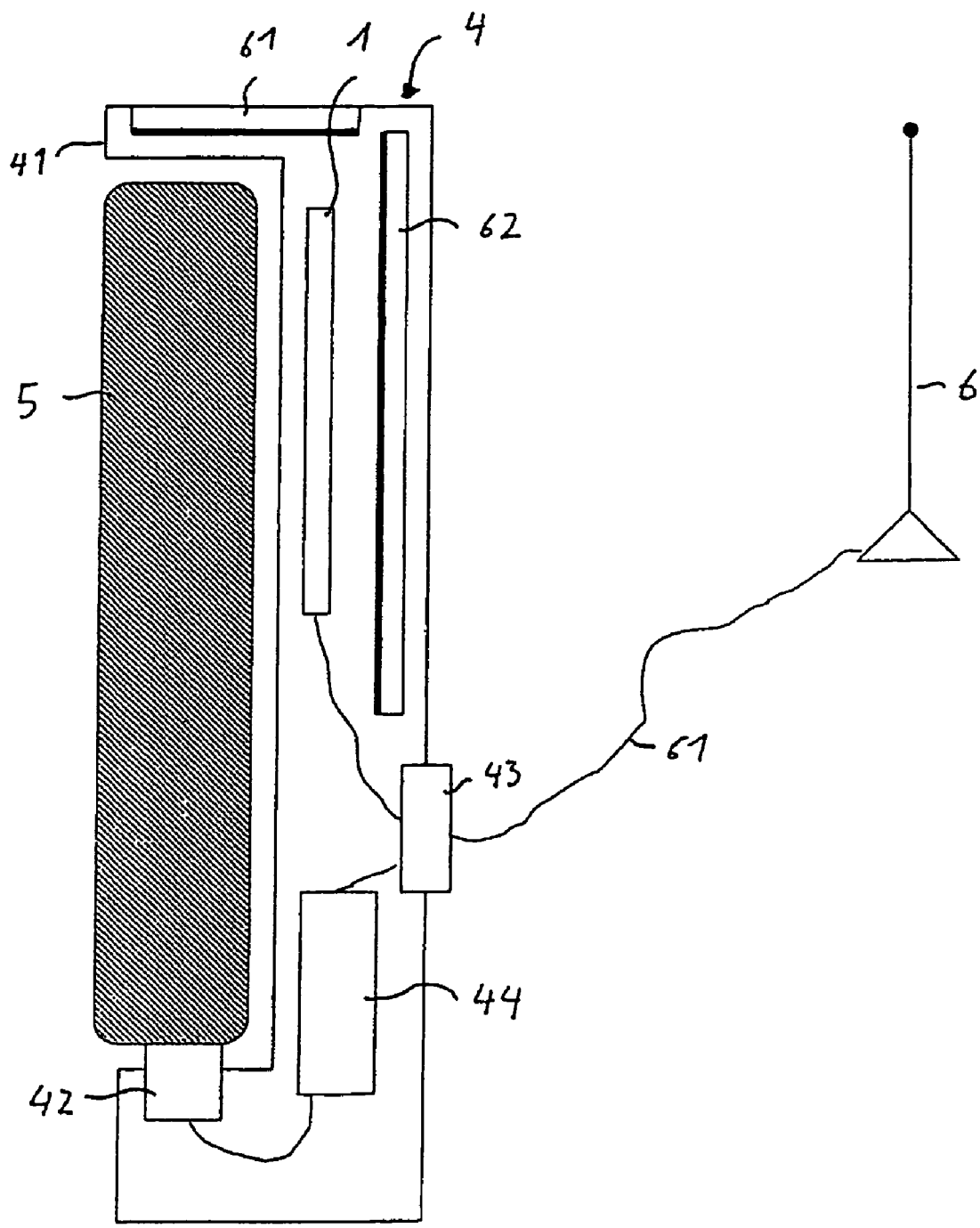
FIG. 1 shows a schematic illustration of a vehicle mobile radio holder according to the invention for a first exemplary embodiment of the invention.

FIG. 1 shows a mobile radio terminal 5, a vehicle mobile radio holder 4, an external antenna 5 and a connecting cable 61.

The mobile radio terminal 5 is a GSM terminal (GSM=Global System for Mobile Communication). The mobile radio terminal 5 is in this case preferably a mobile radio terminal which can communicate using two or more frequency bands (2 band, 3 band). Furthermore, it is also possible for the mobile radio terminal 5 to operate using a different mobile radio standard in which case, for example, the mobile radio terminal 5 may be a UMTS terminal (UMTS=Universal Mobile Telecommunications System).

The vehicle mobile radio holder 4 is designed such that it can mechanically hold the mobile radio terminal as described above. The mobile radio holder 4 thus has a housing part 41 which is shaped to hold the mobile radio terminal 5 and, for example, has a depression which corresponds to the rear face of the mobile radio terminal 5. In addition to purely mechanical retention, it is advantageous for the vehicle mobile radio holder 4 to have a holding apparatus which fixes the mobile radio terminal 5 within the vehicle mobile radio holder 4. This holder may, for example, be a holding bracket, a locking mechanism or elements which produce a mechanical clamping effect between the housing of the vehicle mobile radio holder 4 and the housing of the mobile radio terminal 5.

The vehicle mobile radio holder 5 has an electrical connecting element 42 which engages in an interface of the mobile radio terminal 5 when the mobile radio terminal 5 is inserted into the vehicle mobile radio holder 4 as far as the limit position. This interface may, for example, be an electrical or optical control interface, and/or an interface for an external electrical power supply.

The electrical connecting element 42 could also be dispensed with.

The vehicle mobile radio holder 4 also has an electrical circuit 44, a coupling antenna 1, two reflective elements 61 and 62 and an electrical connecting element 43. Furthermore, the vehicle mobile radio holder is designed such that it is suitable for installation in motor vehicles. The housing of the vehicle mobile radio holder 4 may for this purpose, for example, have corresponding cutouts, by means of which it can be connected to the motor vehicle via attachment means. By way of example, it can be connected to the motor vehicle by means of a screw connection or by latching.

The coupling antenna 1 is connected to the electrical connecting element 43 via a connecting line. This electrical connecting line is, for example, a coaxial cable. The connecting element 43 may be a simple conductive connection or a plug element which interacts with a corresponding connector element arranged on the vehicle side. However, it is also possible to dispense with a connecting element 43 and connect the connecting cable 61 directly to the coupling antenna 1.

The external antenna 6 is, for example, an external antenna of a motor vehicle. The external antenna 6 may, however, also be a second antenna which is arranged within a motor vehicle, is fitted, for example, in the area of the window surface, and whose emission behavior is thus less influenced by the vehicle bodywork.

The electrical circuit 44 provides the function of a hands-free device and is connected via the connecting element 43 to corresponding peripheral components (microphone, loudspeaker, display, etc.) which are arranged within the vehicle. It would, of course, also be possible to dispense with the electronic circuit 44.

The reflective elements 61 and 62 are each formed by a mount substrate and a layer which is applied over the complete surface of this mount substrate and is composed of a conductive material, for example of a metal. In the simplest case, the reflective elements 61 and 62 comprise a thin mount layer composed of an FR4 material which is provided with a thin copper layer. However, the reflective elements 61 and 62 may also be a flexible plastic film, which is composed of an electrically conductive plastic, has a thin conductive layer vapor-deposited on it, or is coated in some other way.

As shown in FIG. 1, the reflective element 62 is oriented essentially at right angles to the main emission direction of the antenna of the inserted mobile radio terminal 5, and is arranged underneath the coupling antenna 1, when seen from the inserted mobile radio terminal 5. In this case, when seen from the mobile radio terminal 5, the reflective element 62 covers a larger area than the coupling antenna 1. The electromagnetic radiation which is emitted from the antenna of the mobile terminal 5 in the main emission direction and is not injected into the coupling antenna 1 is reflected back by this arrangement of the reflective element 62 onto the coupling antenna 1. These field components are thus available for injection once again.

The reflective element 61 is arranged at the side of the coupling antenna 1. Because of the specific configuration of the housing of the vehicle mobile radio holder 4, the reflective element 61 covers the end face of the mobile radio terminal 5 and can thus reflect back in the direction of the coupling antenna 1 a large proportion of those field components of the electromagnetic field which is produced by the antenna of the mobile radio terminal which are not emitted in the mean emission direction. These field components are thus also available for injection into the coupling antenna 1.

The shape and arrangement of the reflective elements 61, 62 as illustrated in FIG. 1 may, of course, also be varied. For example, it is thus also possible to dispense with one of the reflective elements 61 or 62 or to arrange further reflective elements, for example on that face of the coupling antenna 1 which is opposite the reflective element 61. Furthermore, it is also possible not to provide the reflective elements with a planar shape but to provide curved structures in a similar way to a parabolic mirror which reflects onto the coupling antenna 1 the electromagnetic radiation which is emitted from the antenna of the mobile radio terminal 5.

When using entire-area electrically conductive layers as reflective elements, care should be taken in this case to ensure that the size of these areas is in the range from 10 to 15 mm. Furthermore, it is also possible to use the dipole structures or monopole structures as reflective elements.

In this case, they must satisfy the following conditions:

Electrical length=$\lambda/4$;

$\lambda$=frequency being used.

Figure 2A:
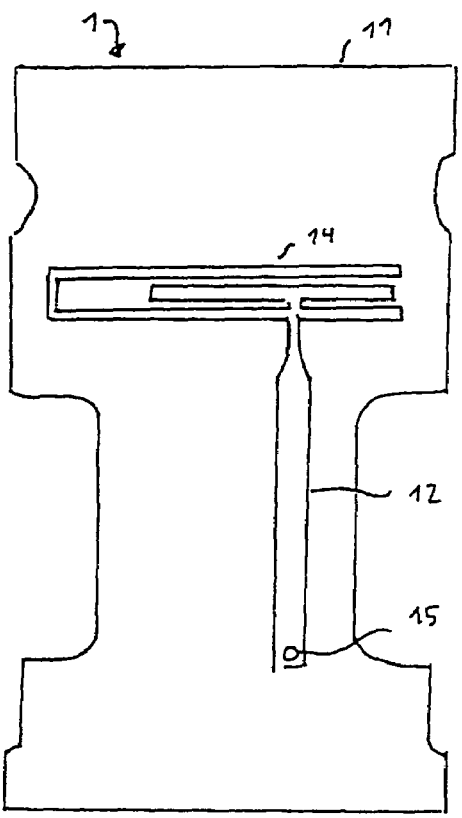
FIG. 2a and FIG. 2b show two different views of a coupling antenna for use in the vehicle mobile radio holder shown in FIG. 1.

FIG. 2a now shows a view of one face of the coupling antenna 1. In this exemplary embodiment, the coupling antenna 1 is formed by a thin, non-conductive substrate and by webs and surfaces of conductive material applied to this substrate.

The antenna coupler 1 thus has a substrate 11, a coupling structure 14 formed by the conductive material, a waveguide 12 formed by the conductive material, and an interface 15 for connection of the external antenna 6.

The thin substrate 12 is preferably a board. FR4 material is used as the material for the substrate 11, that has an electric constant of 4.5 to 4.6. Furthermore, it is also possible to use a ceramic mount of RT Durite as the substrate. The use of a ceramic mount means that the size of the coupling structure can be variable. The thin substrate has a thickness of 0.6 mm to 1 mm.

The coupling structure 14 and the waveguide 12 are formed from conductive material which is applied to the substrate 11. This conductive layer preferably has a thickness of 35 μm to 70 μm, but may also be considerably thinner. As can be seen from FIG. 2a, the conductive material and the substrate 14 form a surface pattern that provides the function of the waveguide 12 and of the coupling structure 14. In this case, in particular, a metal, for example copper, may be used as the conductive material. However, the conductive material may also be a conductive plastic.

Figure 2B:
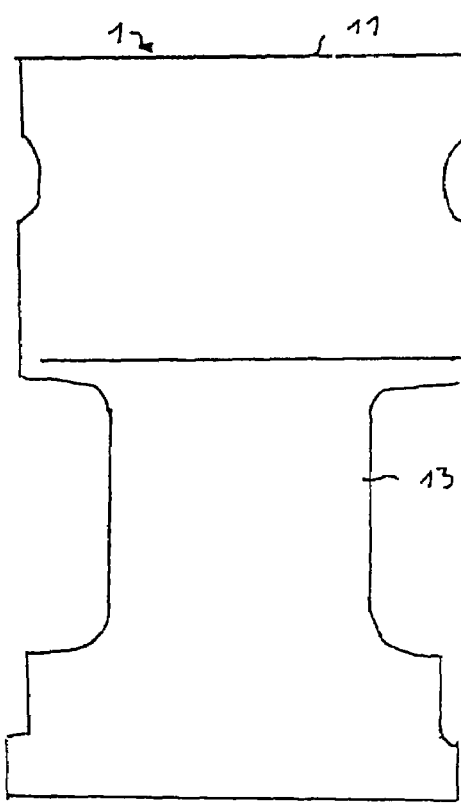

FIG. 2b now shows the other face of the thin substrate 11, that is to say the rear face of that face of the thin substrate 11 which is illustrated in FIG. 2a. FIG. 2b thus once again shows the coupling antenna 1, the thin substrate 11 and, in addition, a ground plane 13. As can be seen in FIG. 2b, the ground plane occupies the lower part of the surface of the thin substrate 11. The ground plane 13 is thus not arranged in the area of the coupling structure 14. The ground plane 13 starts in the area of the waveguide 12. In this case, the shape of the ground plane 13 can be varied. For example, it is also possible for the ground plane also to be arranged in the upper part of the thin substrate, provided that it excludes the area of the coupling structure 14. Furthermore, the ground plane 13 may also only partially cover the lower area of the thin substrate. In this case, however, it is important for the ground plane to be provided in the area of the waveguide 12.

Figure 3:
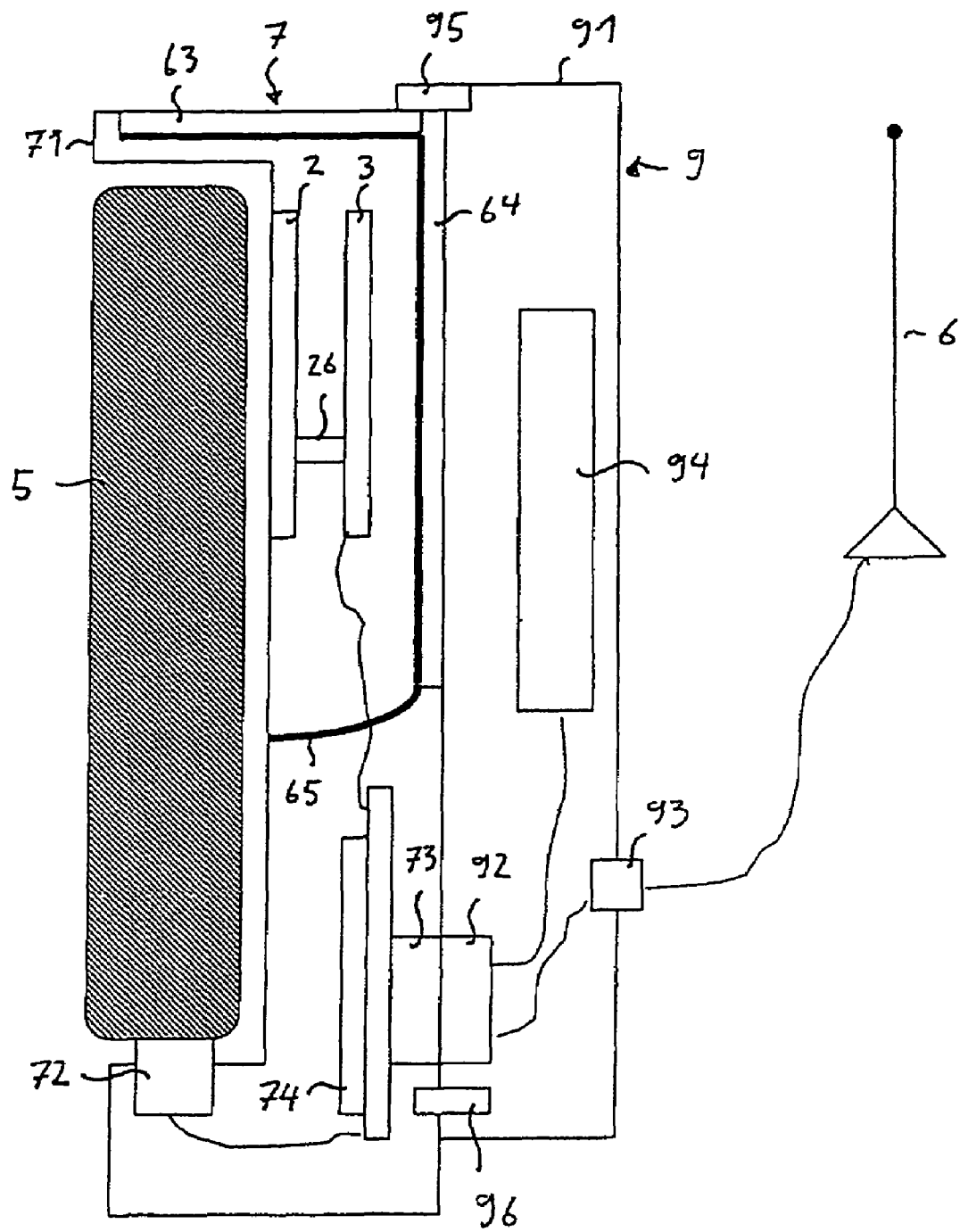
FIG. 3 shows a schematic illustration of a vehicle mobile radio holder according to the invention for a second exemplary embodiment of the invention.

FIG. 3 shows a vehicle mobile radio holder according to the invention, which comprises a holding apparatus 7 matched to the mobile radio terminal 5, and a base part 91. The holding apparatus 7 has a housing 71, an electrical connecting element 72, an electronic circuit 74, a coupling antenna composed of two coupling structure elements 2 and 3, three reflective elements 63, 64 and 65, and an electrical connecting element 73.

That housing part of the housing 71 which is oriented towards the mobile radio terminal 5 is shaped to hold the mobile radio terminal 5 and thus, by way of example, has a depression which corresponds to the contour of the rear face of the mobile radio terminal 5.

The electrical connecting elements 72 and 73 as well as the electronic circuit 74 are designed in the same way as the connecting elements 42 and 43 and the electronic circuit 44 as shown in FIG. 1.

Furthermore, the reflective elements 63, 64 and 65 are designed in the same way as the reflective elements 61 and 62 shown in FIG. 1. The reflective elements 63 and 64 are each in the form of a layer composite comprising a mount substrate and a thin conductive layer applied to this mount substrate. The reflective element 65 is a thin substrate composed of a conductive material, for example a conductive plastic. As illustrated in FIG. 3, the reflective elements 63, 64 and 65 are arranged differently to the reflective elements 61 and 62 as shown in FIG. 1 within the housing 71, with the coupling antenna being surrounded by reflective elements over the entire surface in the area of the rear face of the mobile radio terminal 5.

The base part 9 has a housing 91, an electronic circuit 94 arranged in the housing 91, two electrical connecting elements 92 and 93, and locking elements 95 and 96.

The housing 91 has recesses by means of which the housing 91 can be connected to the vehicle. The locking elements 95 and 96 produce a detachable mechanical connection between the base part 9 and the holding apparatus 7. In addition to the use of locking elements, it is also possible to achieve a connection such as this by latching the base part 9 to the holding apparatus 7. The electrical connecting element 92 represents an electrical plug-element, which is shaped and arranged to be complementary to the associated plug-in element on the holding apparatus 7, the electrical connecting element 73. The electronic circuit 94 provides, for example, a function of a hands-free device or of a navigation system. It would, of course, also be possible to dispense with the electronic circuit 94. The external antenna 6 is coupled via the electrical connecting elements 93, 92, 73 and the electronic circuit 74 to the coupling antenna, which is formed by the coupling structure elements 2 and 3.

The coupling structure elements 2 and 3 are each composed of a conductive material which is applied to one face of a thin mount substrate, in particular a board. In this case, it is also possible to dispense with the mount substrate if the coupling structure elements are formed from a conductive material with a thickness which is sufficiently mechanically robust.

The two coupling structure elements 2 and 3 are arranged on planes which are essentially parallel to one another and separated from one another by about 3.5 mm. The distance between the coupling structure elements 2 and 3 may in this case be varied as a function of the mobile radio terminal to be inserted and the dielectric constants of the mount materials used, as well as the distance between the coupling structure element 2 and the antenna of the mobile radio terminal 5. Measurements have shown that the coupling structure elements 2 and 3 can preferably be arranged at a distance of more than 3 mm from one another.

Figure 4A:
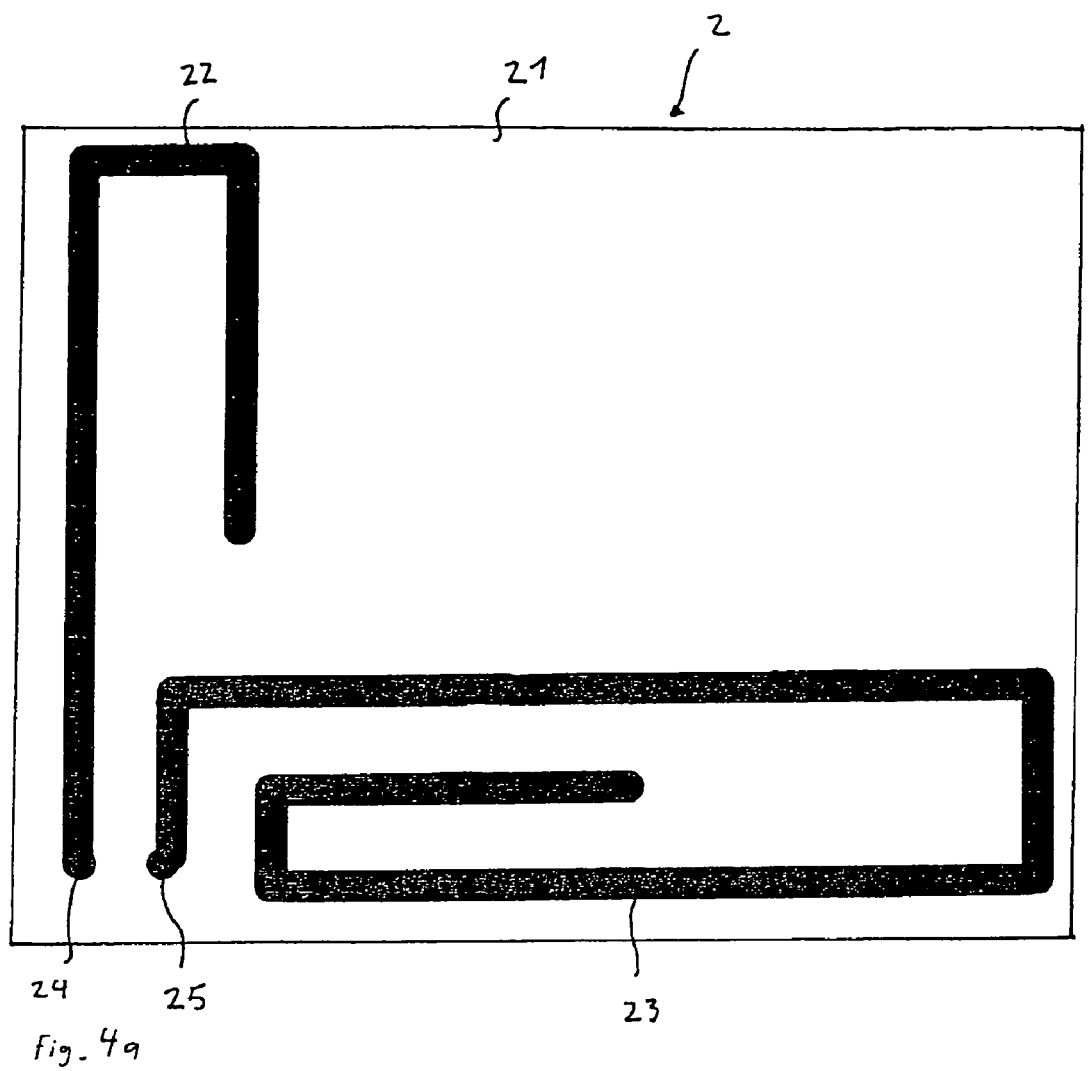
FIGS. 4a, 4b and 4c show views of coupling structure elements of a coupling antenna which can be used for the vehicle mobile radio holder as shown in FIG. 3.
Figure 4B:
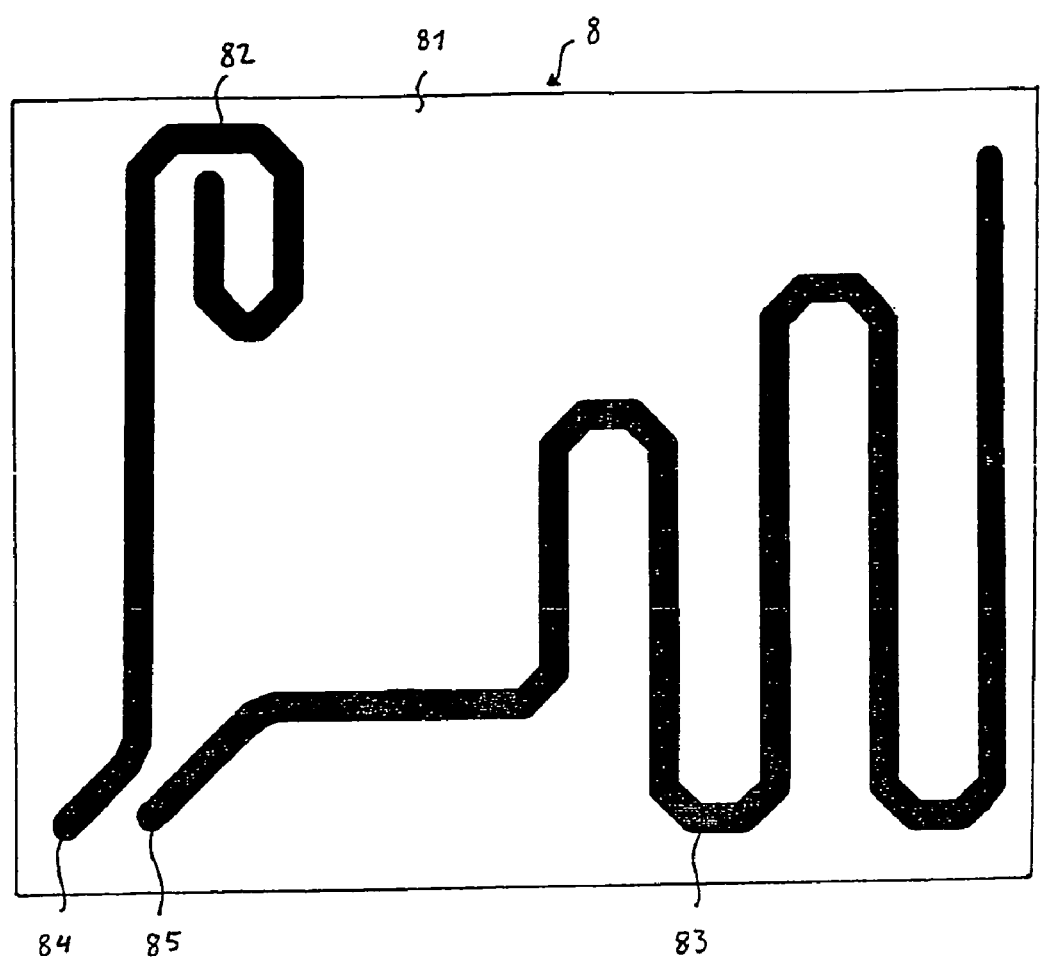
Figure 4C:
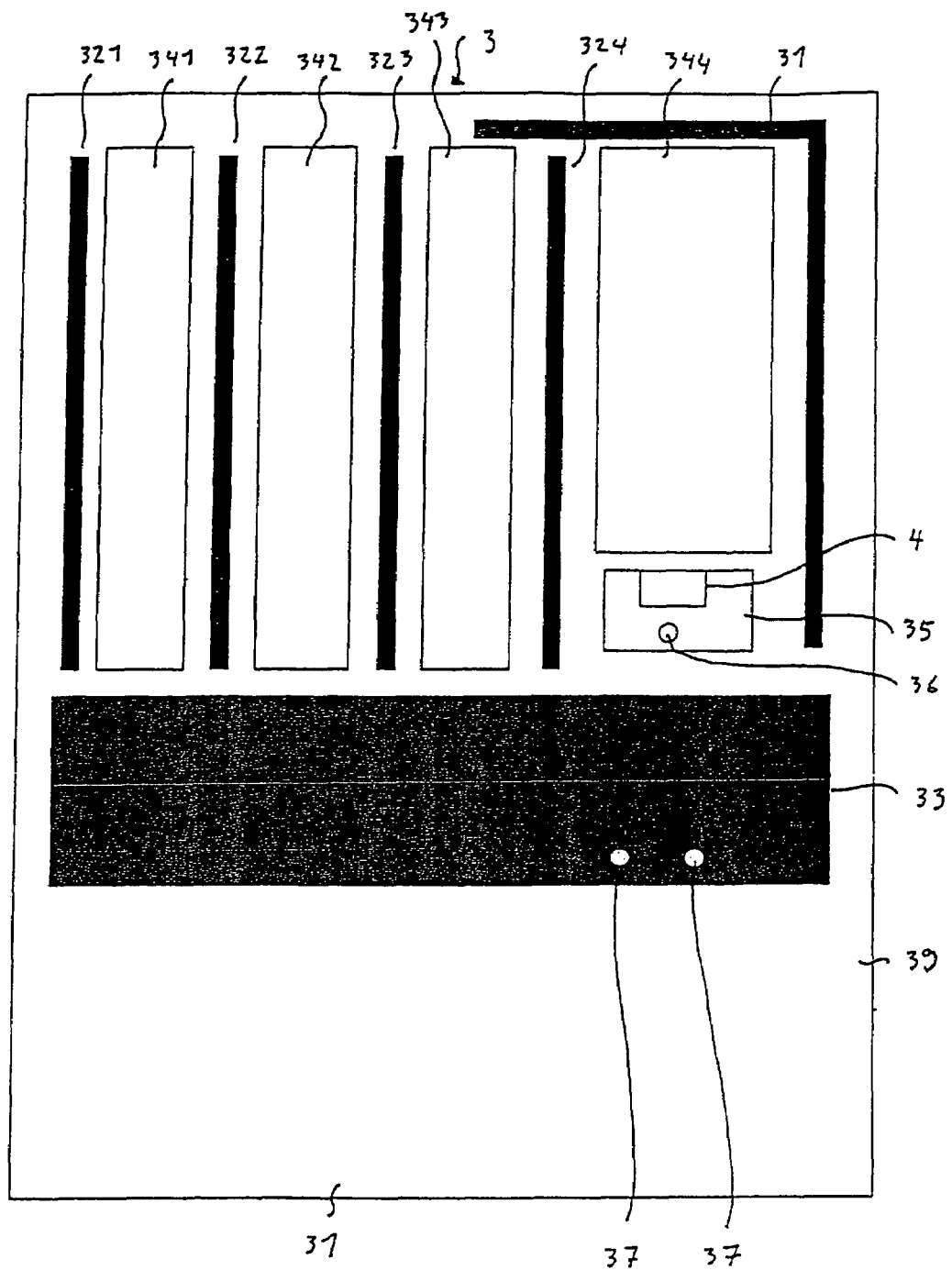

Two preferred embodiments of the coupling structure element 2 are illustrated in FIGS. 4a and 4b. One preferred embodiment of the coupling structure element 3 is illustrated in FIG. 4c. The two coupling structure elements 2 and 3 are in this case connected to one another by means of an electrical connecting element 26.

The electrical connecting element in this case produces a single-conductor or multiple-conductor electrical connection between the coupling structure elements 2 and 3.

FIG. 4a shows a view of one face of the coupling structure element 2. In this exemplary embodiment, the coupling structure element is formed by a thin, non-conductive substrate, and by structure elements which are applied to this substrate and are composed of conductive material. The coupling structure element 2 thus has a dielectric body 21 and two structure elements 22 and 23, which are formed from the conductive material and have two coupling points 24 and 25. Reference should be made to the statements relating to FIG. 2a and FIG. 2b with regard to the materials used for the dielectric body 21 and for the structure elements.

As is shown in FIG. 2, the structure elements 22 and 23 have different shapes and are intended for different wavelength ranges. The structure element 22 is intended for the 1800 MHz band. The structure element 23 is intended for the 900 MHz band. As is shown in FIG. 4a, the structure element 22 is oriented horizontally, and the structure element 23 is oriented vertically. The coupling structure element 22 is in this case in the form of a loop which is not completely closed, whose length is about 14 mm, and whose width is about 5 mm. The width of the conductor track from which the coupling structure element 22 is formed is about 1 mm. The coupling structure element 23 has an elongated spiral shape. The length of the spiral formed in this way is about 25 mm, and its width is about 8 mm.

FIG. 4a shows an alternative embodiment of the coupling structure elements 22 and 23.

FIG. 4a shows a coupling structure element 8 which is formed from structure elements 82 and 83 composed of a thin conductive material and a dielectric body 81.

The structure elements 82 and 83 are shaped differently, with the structure element 82 being intended for the 1800 MHz band, and the structure element 83 for the 900 MHz band. The two structure elements 82 and 83 are also oriented differently. By way of example, the structure element 82 is oriented vertically, and the coupling structure element 83 horizontally. The structure element 82 has a spiral shape, while the structure element 83 has a meandering shape.

It is, of course possible for the dimensions of the structure elements 22, 23, 84 and 85 to be varied in order to match them to the frequency bands used by the mobile radio terminal 5, to the dielectric constants of the dielectric bodies used and to their distance from the antenna of the mobile radio terminal 5. Furthermore, it is also possible to interchange the structure elements 22 and 82 or 23 and 83 with one another, or even to couple them to one another within the possible coupling structure elements.

FIG. 4c shows the coupling structure element 3a, which is formed by a dielectric body 39 and by a plurality of structure elements 321 to 324, 31 and 33 which are composed of the electrically conductive material. The structure elements 321, 322, 323, 324 and 31 can be connected to the structure element 33 by means of capacitors. This allows the coupling antenna to be tuned to the respective mobile radio terminal. By way of example, the structure elements 321 and 31 are thus connected to the structure element 33 via capacitors, (not shown in FIG. 4c). Milled areas 341, 342, 343 and 344 are provided between the structure elements 321 to 324, 31 and 33. Such internal milled areas can also be formed on the dielectric bodies 21 and 81. Furthermore, the dielectric body 31 has a combiner 35, which is connected to the electrical connecting element 26. The combiner 35 is used for coupling the structure elements 24 and 25, as well as 84 and 85, in FIGS. 4a and 4b. The combiner 35 in this case couples the structure elements to a coupling point 36 by means of capacitors or coils.

Furthermore, the structure element 33 has one or more coupling points 37. The inner conductor of the antenna cable is now connected to the coupling point 36, and the outer conductor of the antenna cable is connected to the coupling points 37.

Figure 5:
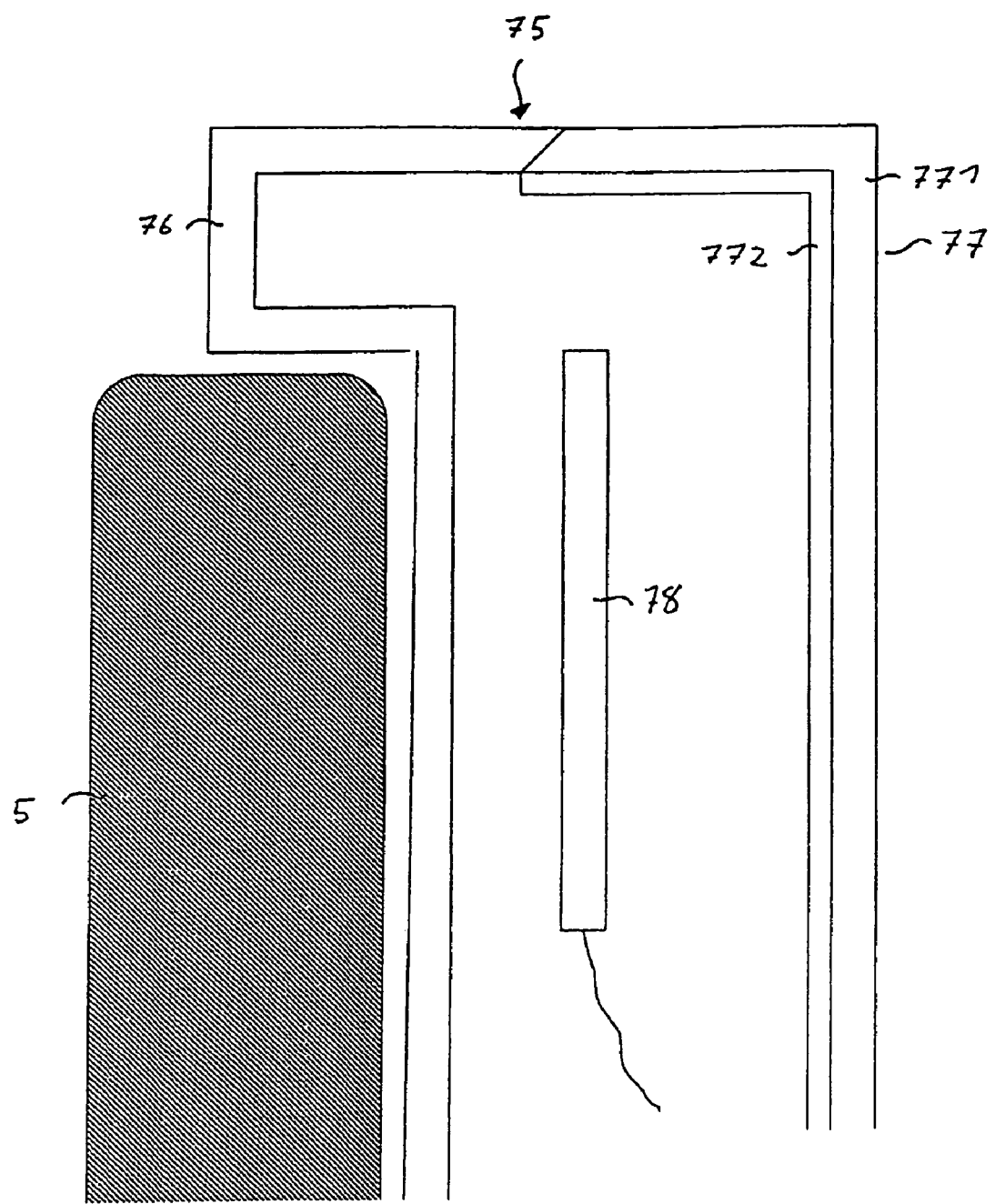
FIG. 5 shows a detail from a schematic section illustration of a vehicle radio mobile holder for a third exemplary embodiment of the invention.

FIG. 5 shows a section through a vehicle mobile radio holder 75 in which the mobile radio terminal 5 has been inserted. The vehicle mobile radio holder 75 has a housing which is composed of two or more housing parts. FIG. 5 shows two of these housing parts, 76 and 77.

The housing part 76 is shaped to hold the mobile radio terminal 5 and thus, for example, in places models the external shape of the mobile radio terminal 5. The housing part 76 is in this case in the form of a plastic injection-molded part. The housing part 77 forms that face of the housing of the vehicle mobile radio holder 75 which faces away from the inserted mobile radio terminal 5. The housing part 77 is likewise manufactured from an injection-molded part 771, but is coated with a thin conductive layer 772. The layer 771 is a thin metallic layer, which is applied to the plastic injection-molded part 771 by means of a coating process. As is shown in FIG. 5, the inner face of the plastic injection-molded part 771 is in this coated over its entire area with the thin conductive layer 772. It is, of course, also possible for the outer face of the plastic injection-molded part 71 to be coated with the conductive layer 772, and/or for the thin conductive layer 772 to be applied to the plastic injection-molded part 771 only in places.

The thin conductive layer 772 in this case acts as a reflective element as has already been described for the reflective elements 61, 62, 63, 64 and 65 shown in FIG. 1 and FIG. 3. Reference should be made to the statements relating to FIG. 1 and FIG. 3 for the combination options and for the embodiment of application, only in places, of the conductive layer 772 to the plastic injection-molded part 771.

A coupling antenna 78 is arranged within the space that is surrounded by the housing parts 76 and 77. It is also possible for the coupling antenna 78 to be fitted to the outer face or to the inner face of the housing part 76, for example by being adhesively bonded to the housing part 76 in the area of the main emission direction of the mobile radio terminal 5.

As has already been described above, it is also possible to use absorbent elements, in addition to reflective elements. On the one hand, foams which absorb electromagnetic radiation may be used as the absorbent elements.

It is also possible to use absorber structures as absorbent elements.

FIGS. 6a to 6d now show a number of possible ways in which absorber structures such as these can be produced.

Figure 6A:
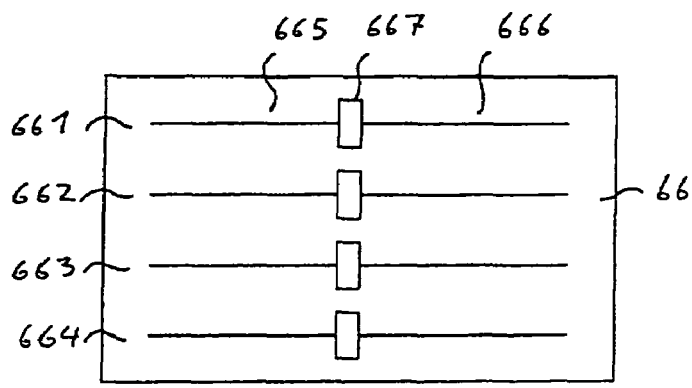
FIGS. 6a, 6b, 6c and 6d show various absorber structures for use in vehicle mobile radio holders as shown in FIGS. 1, 3, 5; 7a and 7b.

FIG. 6a shows an absorber structure 66 which comprises a plurality of identical structure elements 661 to 664.

The design of the structure elements 661 to 664 will now be described by way of example with reference to the design of the structure element 661:

The structure element 661 has two conductors 665 and 666, which are composed of a conductive material and are applied to a thin substrate. The two electrical conductors 65, 66 are connected via an absorber 667 which, for example, is formed by a resistance. The electrical conductors 65 and 66 in this case each preferably have a length of 10 to 15 mm.

Figure 6B:
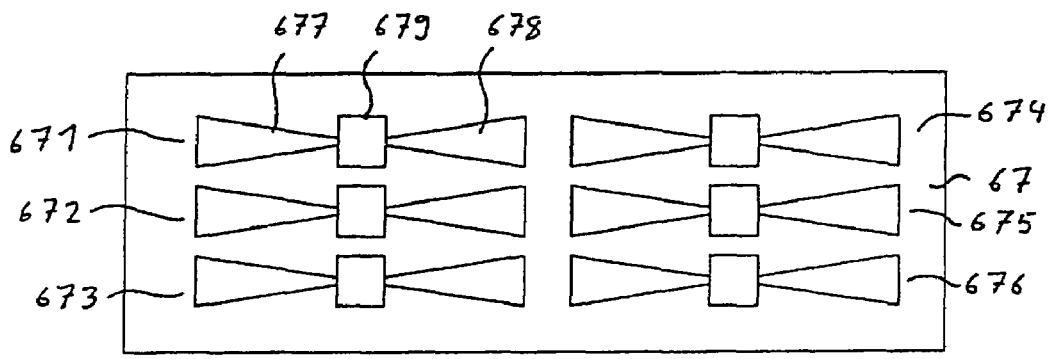

FIG. 6b shows an absorber structure 67, which is likewise formed from a large number of identical structure elements 667 to 676. As is shown in FIG. 6b, these structure elements are formed via two conductors, which are in each case arranged in the form of a triangle and are connected via an absorber 679.

Figure 6C:
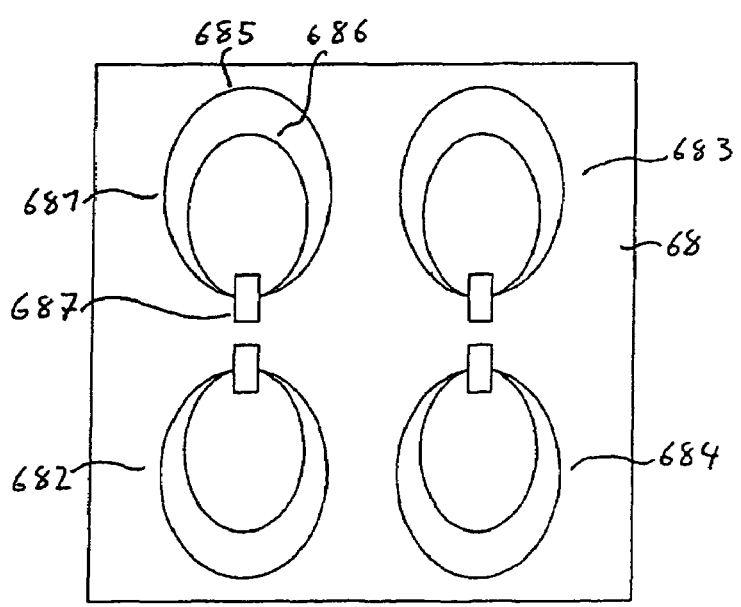

FIG. 6c shows an absorber structure 663 which is formed from four structure elements 681 to 684. The structure elements in each case have two conductors 685 and 686, which are arranged in the form of an oval and are connected via an absorber 687.

Figure 6D:
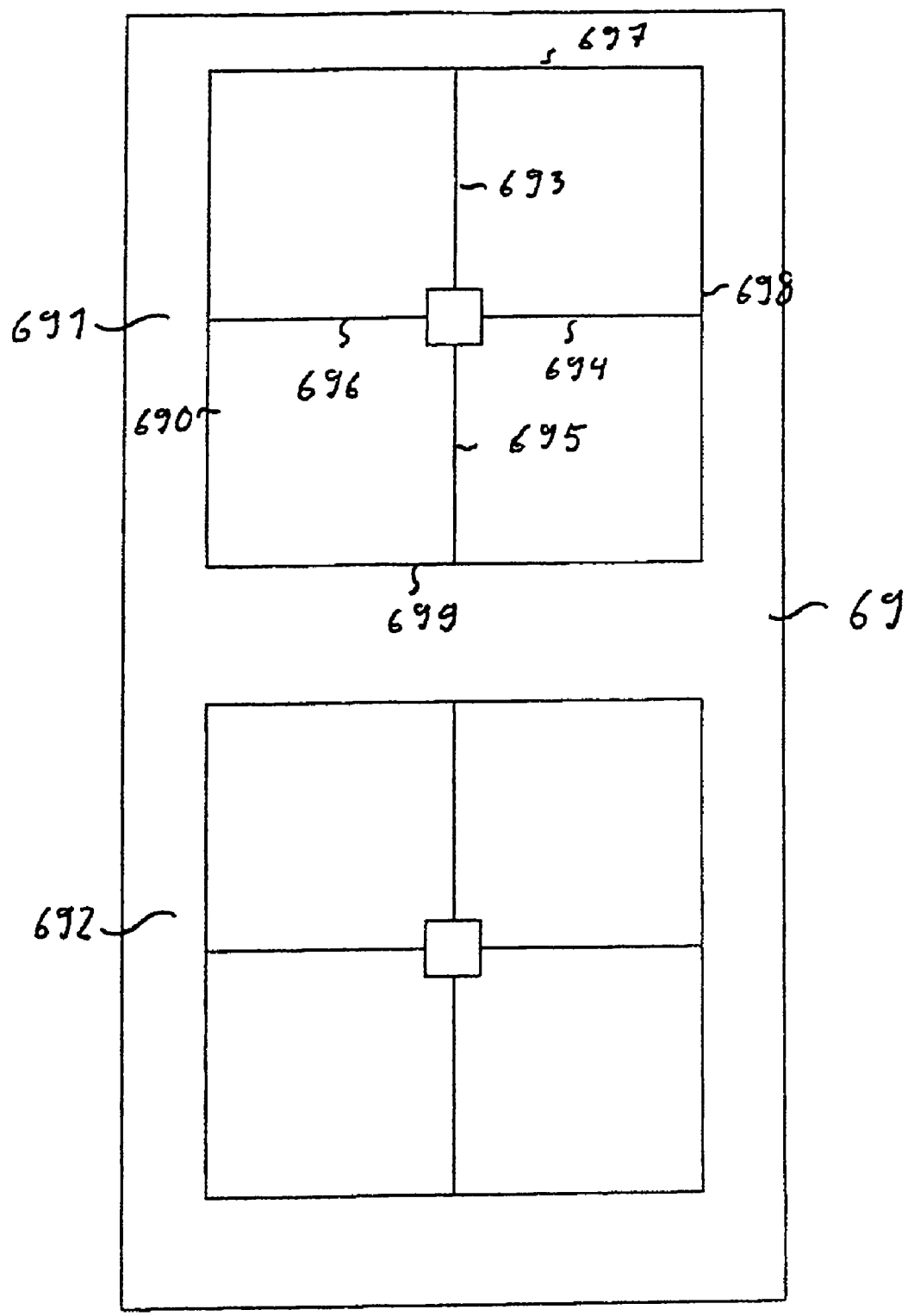

FIG. 6d shows an absorber structure 69 which is formed from two structure elements 691 and 692. The structure elements each have conductors 693 to 699 and 690 which are arranged in the form of a network and are connected to one another by an absorber. It is, of course, also possible to use absorber structures which are composed of a combination of different structure elements as shown in FIG. 6a to FIG. 6d.

The absorbent elements may in this case be used instead of the reflective elements 61, 62, 63, 64, 65 and 772 as shown in FIG. 1, FIG. 3 and FIG. 5. A combination of reflective elements and absorbent elements is possible. A flexible carbon material can also be used as the mount substrate for the absorbent structures 66 to 69, and is then inserted into the housing of the vehicle mobile radio holder in the desired shape.

Figure 7A:
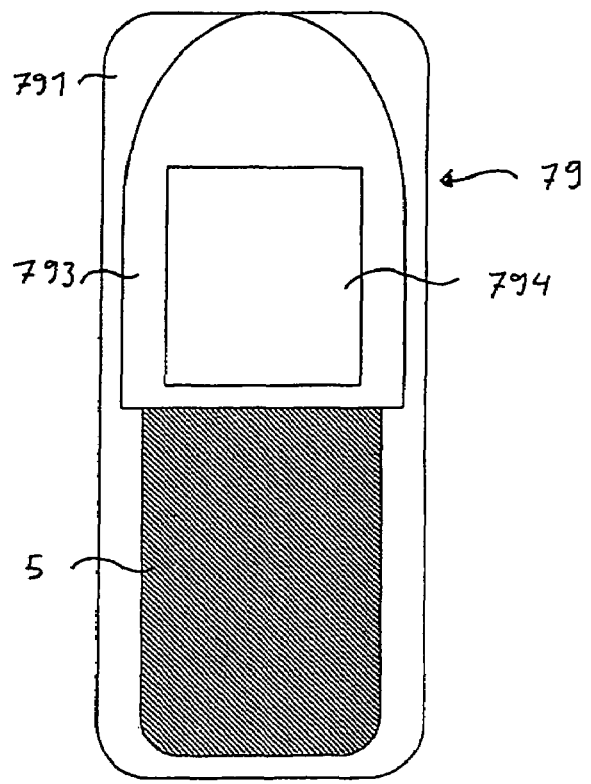
FIG. 7a shows a first view of a vehicle mobile radio holder according to the invention for a fourth exemplary embodiment of the invention.
Figure 7B:
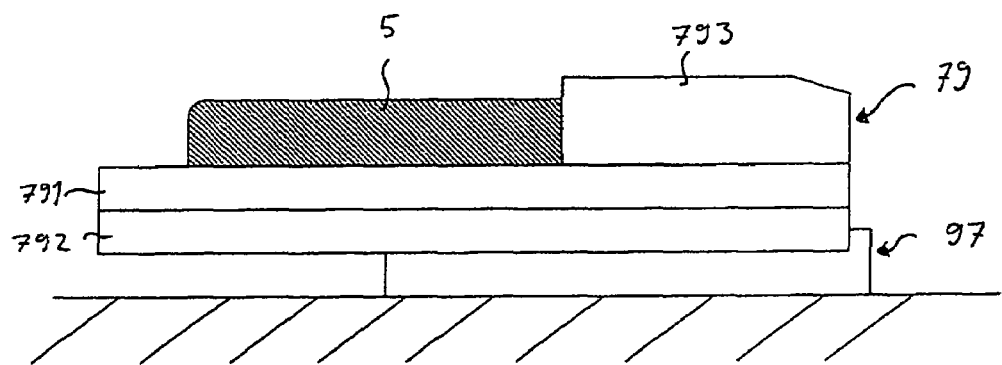

FIG. 7a and FIG. 7b show two different views of a vehicle mobile radio holder 79 into which the mobile radio terminal 5 has been inserted. The vehicle mobile radio holder 79 has three housing parts 791, 792 and 793, and is detachably connected to the vehicle by means of a baseplate 97.

As is shown in FIG. 7b, the housing part 791 is shaped to hold the mobile radio terminal 5. Like the housing part 77 shown in FIG. 5, the housing part 792 is coated with an internal layer composed of an electrically conductive material. A coupling antenna is arranged within the cavity formed by the housing parts 791 and 792, at the same level as the main emission direction of the inserted mobile radio terminal 5.

When the mobile radio terminal 5 has been inserted into the vehicle mobile radio holder 79, the housing part 793 together with the housing part 791 surround the upper part of the mobile radio terminal 5. The housing part 793 is in this case coated with an electrically conductive layer, at least in places, or is composed of an electrically conductive plastic. Reference should also be made to the statements relating to the housing part 77, as shown in FIG. 5, in this context.

It is, of course, also possible for the housing part 793 to cover in places not only the upper part of the mobile radio terminal 5 and it is, in fact, also possible for the mobile radio terminal to be covered over in its entirety by the housing part 793.

As is illustrated in FIG. 7*a*, the housing part 793 has a transparent window 794 in the area of the display of the mobile radio terminal 5, so that the display of the mobile radio terminal 5 can still be seen by the viewer when in the inserted state. It is, of course, also possible to dispense with this transparent window. Furthermore, it would also be possible to produce the entire housing part 793 from a transparent plastic material. Furthermore, it is possible for the housing part 793 to be formed from a plastic injection-molded part which is coated with a very thin and hence also transparent, metal layer.

The housing part 793 may be firmly connected to the housing part 791, with the mobile radio terminal 5 being inserted, during the insertion process, into the recess which is formed by the housing parts 793 and 791, and then being latched, for example by means of a tilting movement, in the vehicle mobile radio holder 79.

Furthermore, it is possible for the housing part 793 to be detachably connected to the housing part 791. For example, it is possible for the housing parts 793 and 791 to be connected to one another by means of a locking mechanism. Bolts which are mounted in the housing part 791 engage, for example, in associated recesses in the housing part 793 and in this way produce a firm mechanical connection between the housing parts 791 and 793 as soon as the mobile radio terminal 5 has been inserted into the vehicle mobile radio holder 79. It is also possible for sprung hook elements to be connected to the housing part 791, and for recesses which are arranged in a corresponding form with respect to them to be provided in the housing part 793, by means of which the housing part 793 can be latched to the housing part 791 after insertion of the mobile radio terminal 5.

Furthermore, it is possible to connect the housing parts 791 and 793 to one another by means of one or more hinges, so that the housing part 793 can be folded upward or to the side. One or more locking or latching elements is or are in this case preferably provided on that face of the housing part 793 which is opposite the hinges, and allows or allow temporary fixing of the housing part 793 in the limit position.

What is claimed is:

1. A vehicle mobile radio holder for mounting a mobile radio terminal in a vehicle, comprising:
    a vehicle mobile radio holder having a housing with a first housing part which is shaped to hold a mobile radio terminal;
    an electrical interface for connection of an external antenna to the vehicle mobile radio holder; and
    a coupling antenna which is electrically connected to the interface, for non-contacting electromagnetic coupling of RE signals between the coupling antenna and the antenna of a telephone which is inserted into the vehicle mobile radio holder;
    wherein the vehicle mobile radio holder includes at least one reflective element for reflection of electromagnetic radiation which has been emitted from the antenna of the mobile radio terminal inserted into the vehicle mobile radio holder and has not been injected into the coupling antenna;
    wherein the holder has at least one absorber element for absorption of the electromagnetic radiation, in which the absorber element is composed of a foam which absorbs electromagnetic radiation and is arranged underneath the coupling antenna or to the side of the coupling antenna, when viewed from the inserted mobile radio terminal.

2. The vehicle mobile radio holder as claimed in claim 1, wherein the absorber element is alternatively composed of one or more absorber structures which absorb electromagnetic radiation and are arranged underneath the coupling antenna, or to the side of the coupling antenna, when viewed from the inserted mobile radio terminal.

3. The vehicle mobile radio holder as claimed in claim 2, wherein the absorber structures are aligned essentially at right angles to a main emission direction of the antenna of the inserted mobile radio terminal.

4. The vehicle mobile radio holder as claimed in claim 1, wherein the reflective element is formed from a conductive layer arranged underneath the coupling antenna when viewed from the inserted mobile radio terminal.

5. The vehicle mobile radio holder as claimed in claim 4, wherein the conductive layer completely covers at least the area covered by the coupling antenna.

6. The vehicle mobile radio holder as claimed in claim 4, wherein the conductive layer is aligned essentially at right angles to a main emission direction of the antenna of the inserted mobile radio terminal.

7. The vehicle mobile radio holder as claimed in claim 1, wherein the reflective element is formed from a conductive layer arranged at the side of the coupling antenna.

8. The vehicle mobile radio holder as claimed in claim 1, wherein the housing of the radio holder has a second housing part that forms that face of the housing which faces away from the inserted mobile radio terminal, the second housing part being coated with an electrically conductive layer or alternatively is composed of an electrically conductive plastic.

9. The vehicle mobile radio holder as claimed in claim 8, wherein the second housing part is provided at least in places with a layer composite which has absorber structures.

10. The vehicle mobile radio holder as claimed in claim 1, wherein the housing of the radio holder has a third housing part that at least partially surrounds the inserted mobile radio terminal together with the first housing part, the third housing part being coated with an electrically conductive layer or alternatively is composed of an electrically conductive plastic.

11. The vehicle mobile radio holder as claimed in claim 10, wherein the third housing part is detachably connected to the first housing part by connecting means selected from a group consisting of a locking mechanism, a means of latching and by means of hinges connected to the first housing part.

12. The vehicle mobile radio holder as claimed in claim 10, wherein the third housing part is provided at least in places with a layer composite which has absorber structures.

13. The vehicle mobile radio holder as claimed in claim 1, wherein the coupling antenna is aligned essentially at right angles to a main emission direction of the antenna of the inserted mobile radio terminal.

14. The vehicle mobile radio holder as claimed in claim 1, wherein the coupling antenna has conductors which are arranged essentially parallel to one another and are coupled to one another, with the two outer conductors being connected in order to form a loop that is not entirely closed, the conductors being composed of conductive material and surround the central conductor.

15. The vehicle mobile radio holder as claimed in claim 1, wherein the coupling antenna is in the form of a two-layer or multiple-layer coupling structure with two or more coupling structure elements arranged one above the other.

* * * * *